F. KUHN, J. A. HAND AND J. G. SPIESS.
ELECTRICALLY HEATED TOOL.
APPLICATION FILED NOV. 14, 1918.
1,320,156.
Patented Oct. 28, 1919.
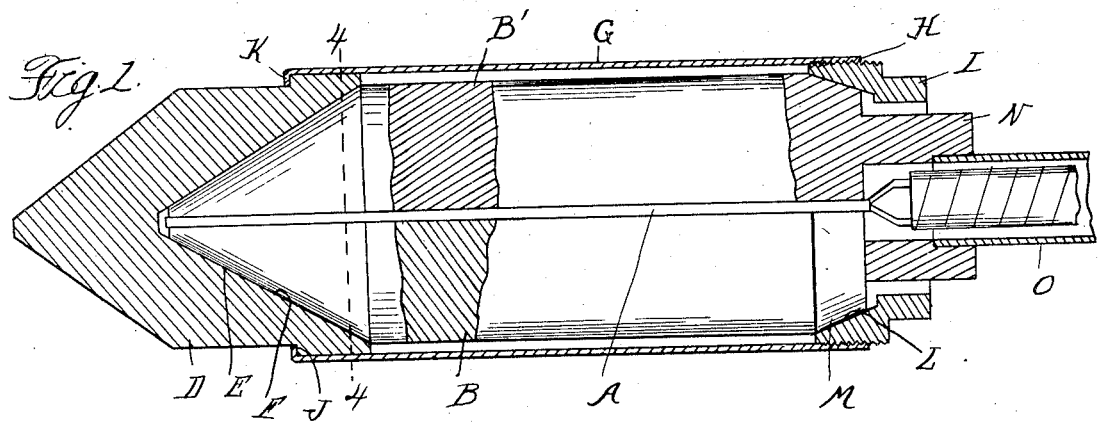
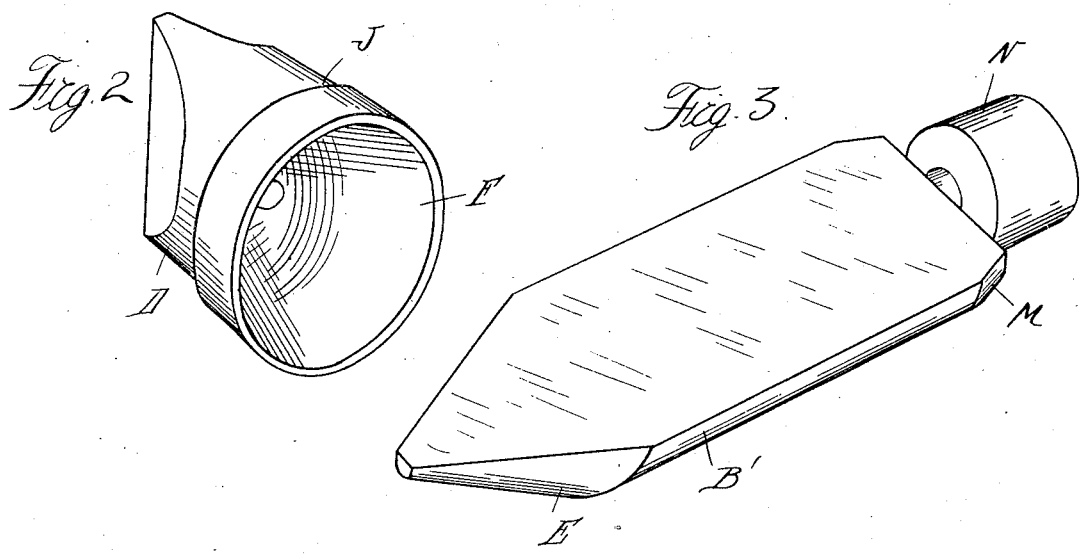
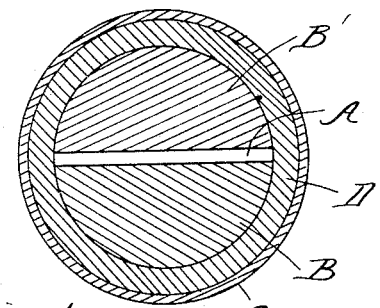
Inventors
Frank Kuhn
Jay A. Hand
Jules G. Spiess
By Whitemore, Hulbert & Whittemore.
Attorneys

UNITED STATES PATENT OFFICE.

FRANK KUHN, JAY A. HAND, AND JULES G. SPIESS, OF DETROIT, MICHIGAN, ASSIGNORS TO AMERICAN ELECTRICAL HEATER COMPANY, OF DETROIT, MICHIGAN, A CORPORATION OF MICHIGAN.

ELECTRICALLY-HEATED TOOL.

1,320,156.  Specification of Letters Patent.  Patented Oct. 28, 1919.

Application filed November 14, 1918. Serial No. 262,440.

*To all whom it may concern:*

Be it known that we, FRANK KUHN, JAY A. HAND, and JULES G. SPIESS, all citizens of the United States of America, residing at Detroit, in the county of Wayne and State of Michigan, have invented certain new and useful Improvements in Electrically-Heated Tools, of which the following is a specification, reference being had therein to the accompanying drawings.

The invention relates to electrically heated tools, being particularly designed for use in the manufacture of soldering irons and devices of a similar nature. It is the object of the invention to provide means for effectively conducting the heat from the resistor to the surface to be heated and at the same time to obtain a construction in which the parts may be readily detached and re-assembled.

In the drawings:

Figure 1 is a longitudinal section through a soldering iron to which our invention is applied;

Fig. 2 is a perspective view of the soldering point detached;

Fig. 3 is a perspective view of one of the heat-distributing members for coöperating with said point;

Fig. 4 is a cross-section on line 4—4 of Fig. 1.

In the manufacture of soldering tools, the point or body which holds the solder is heated to a temperature at which oxidation is rapid. Consequently any mechanical joint between this point member and an adjacent part is liable to stick and prevent disassembling the parts. Where the heat is developed electrically there are many advantages in forming a flat heating unit, but with such a unit the problem arises to effectively conduct the heat into the soldering point and to obtain a construction which may be easily assembled and disassembled. Our invention is designed to overcome these difficulties by a construction as follows:

A is a flat heating unit of any suitable construction (not shown in detail). B and B' are heat absorbing and distributing bodies placed upon opposite sides of the unit A. These heat-distributing bodies with the unit therebetween are preferably circular in cross section, the unit occupying the plane of the longitudinal axis and being co-extensive with the bodies B and B'.

D is the soldering point to which heat is conducted from the bodies B and B'. To produce an effective transmission of the heat and at the same time to permit of separating the point from the bodies B and B', the latter are formed with tapering or conical portions E, while the point member D is formed with the conical recess F therein. Clamping pressure is then applied to force the conical portions E into the conical recess F, preferably by means of a sleeve G having one end secured to the member D and its opposite end threaded at H for engaging with a plug I bearing on the opposite ends of the members B and B'. The sleeve G is preferably engaged with the member D by providing the latter with an annular shoulder J and by flanging in the end of the sleeve as indicated at K. The member I is also preferably formed with a conical recess L for fitting over the conical end portions M on the members B and B', the arrangement being such that when the member I is screwed into the sleeve it will simultaneously force the members B and B' into the member D and also press said members oppositely against the interposed heating unit.

With the construction as described, the parts may be readily assembled and disassembled without any danger of sticking at the joints, due to corrosion. A hollow handle member N may be attached to one of the members, such as B', which, as shown, is provided with the projecting integral lug O and the electrical terminal connections will be carried outward through this hollow handle. The sleeve G being separated from the members B and B' will have an intervening air space for heat insulation, and thus the greater part of the heat stored in the members B and B' will travel longitudinally and into the point member D.

What we claim as our invention is:—

1. In an electrically heated tool, the combination with a heating unit and a heat-distributing body in contact therewith, of a body to be heated having a conical engagement with said heat-distributing body, and clamping means for forcing the conical engaging surfaces together, said clamping means being spaced from said heat-distributing body.

2. In an electrically heated tool, the combination with a heating unit and a heat-distributing body in contact therewith, of a member to be heated having a conical recess therein, a conical portion on said heat-distributing body for engaging said recess, and clamping means for forcing the conical surfaces into engagement with each other, said clamping means being spaced from said heat-distributing body.

3. In an electrically heated tool, the combination with a heating unit, of heat-distributing bodies clamped upon opposite sides of said unit and forming complementary portions of a cone, a body to be heated provided with a conical recess for fitting the conical portions of said heat-distributing body, and means for clamping the conical faces in contact.

4. In an electrically heated tool, the combination with a flat heating unit, of heat-distributing bodies clamped on opposite sides of said unit and forming complementary portions of a cone, and a member to be heated provided with a conical recess for engaging said cone.

5. In an electrically heated tool, the combination with a flat heating unit, of heat-distributing bodies arranged upon opposite sides of said unit and forming at one end thereof complementary portions of a cone, a member to be heated in axial alinement with said heat-distributing bodies and having a conical recess for fitting said cone, a conical recessed member engaging complementary portions of the cone at the opposite end of said heat-distributing bodies, and a tie connection between said member to be heated and the last-mentioned member for effecting the simultaneous clamping of said heat-distributing bodies to said unit and said conical portions with said conical recessed member.

6. In an electrically heated tool, the combination of a body to be heated and having a conical recess therein, a flat heating unit extending in the axial plane of said body to be heated, heat-distributing bodies upon opposite sides of said flat heating unit and having complementary conical portions at one end for engaging the conical recess in the body to be heated, and also complementary conical portions at their opposite ends, a tie sleeve surrounding said heat distributing bodies having one end in engagement with said body to be heated, and a conical recessed member having a threaded engagement with the opposite end of said tie sleeve and bearing against said second-mentioned complementary conical end portions of the heat-distributing bodies.

7. In an electrically heated tool, the combination with a heating unit and a heat-distributing body in contact therewith, of a body to be heated, and means for clamping said bodies in engagement with each other, said means being spaced from said heat-distributing body.

8. In an electrically heated tool, the combination with a heating unit and heat-distributing bodies clamped on opposite sides of said unit, of a member to be heated, and means for clamping said member in end contact with said heat-distributing bodies.

9. In an electricaly heated tool, the combination with a flat heat unit and heat-distributing bodies clamped on opposite sides thereof, of a member to be heated having end contact with said heat-distributing bodies, and means for clamping said member and drawing the same endwise against said heat-distributing bodies.

In testimony whereof we affix our signatures.

FRANK KUHN.
JAY A. HAND.
JULES G. SPIESS.